Patented July 3, 1934

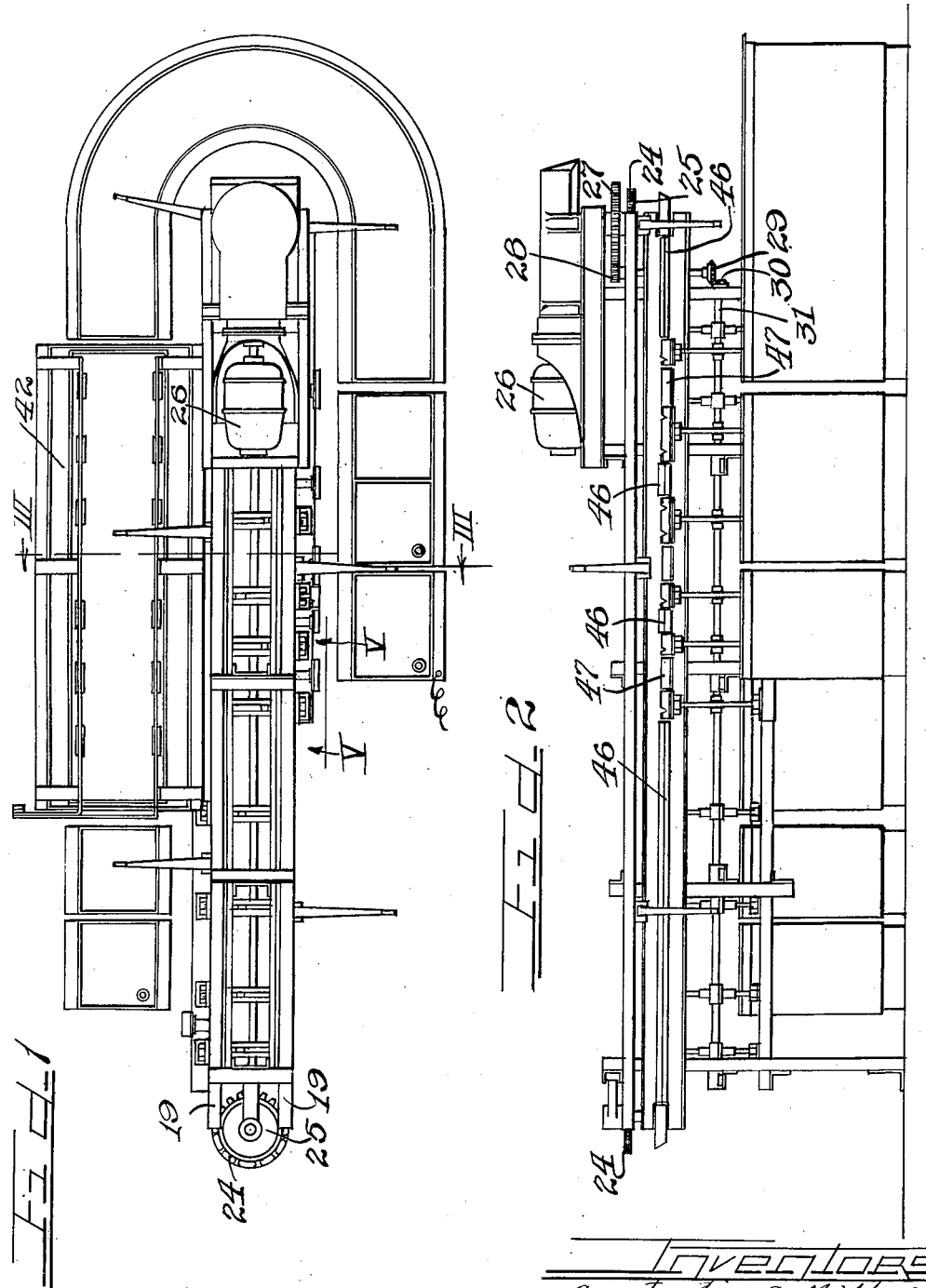

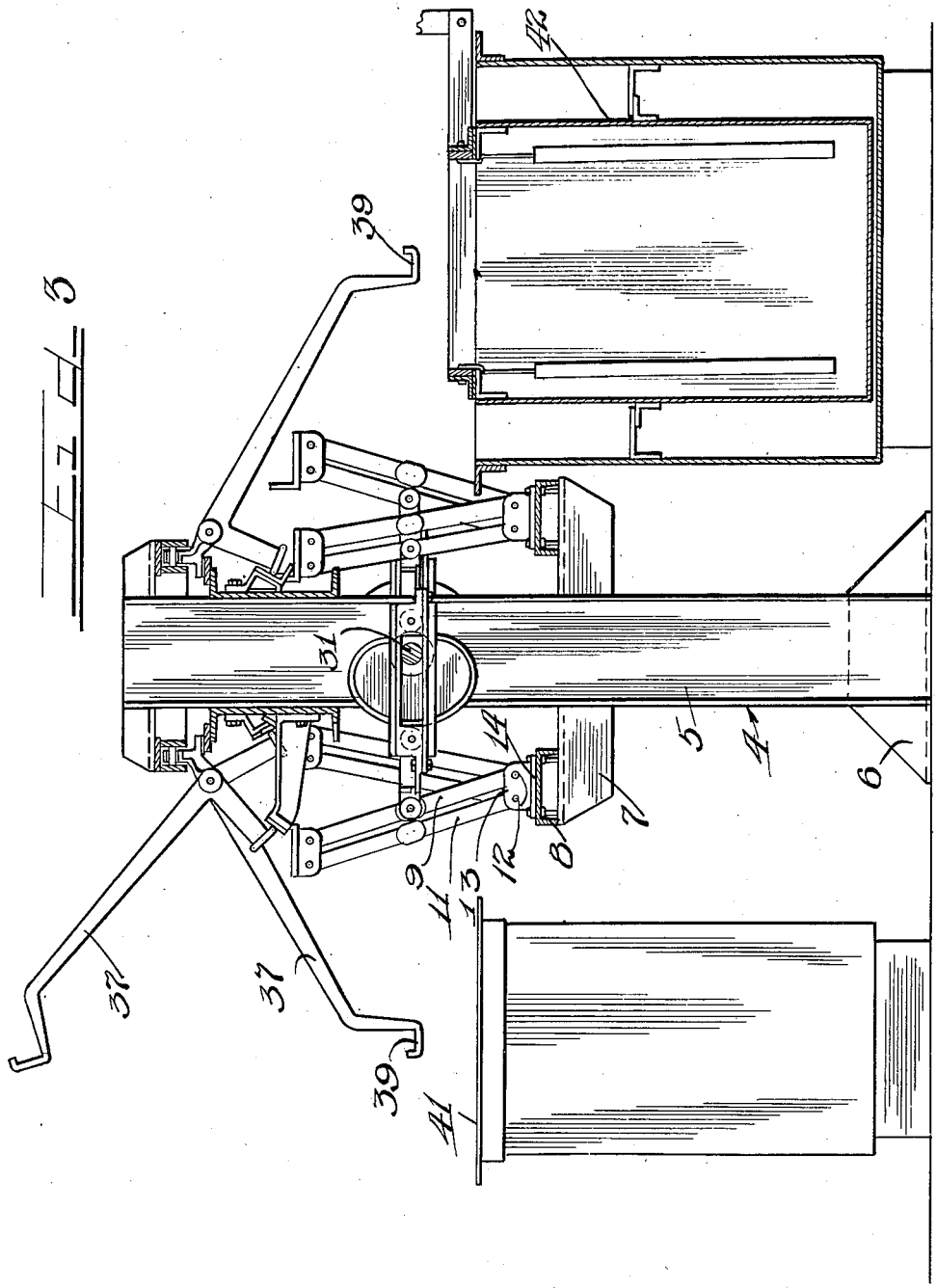

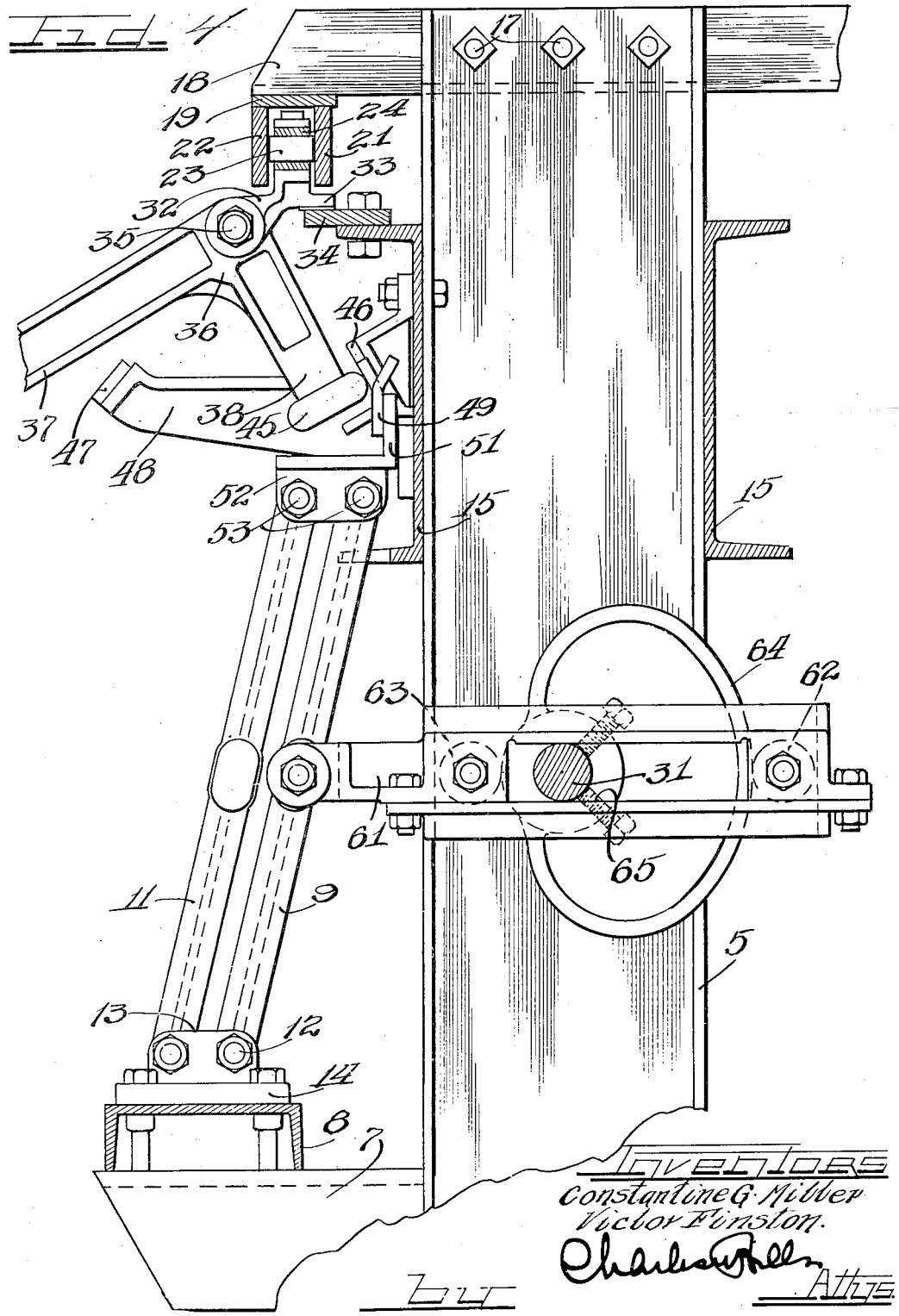

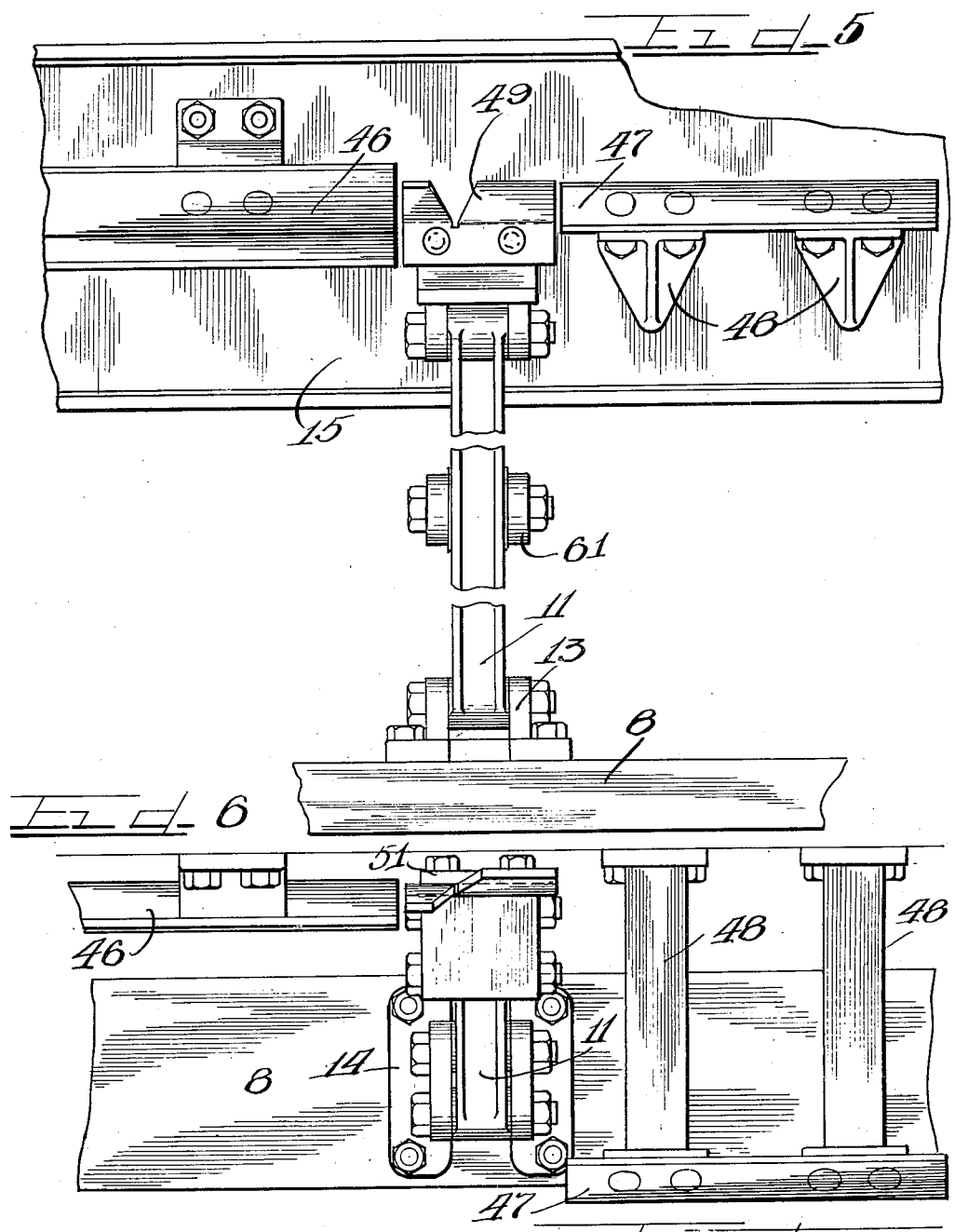

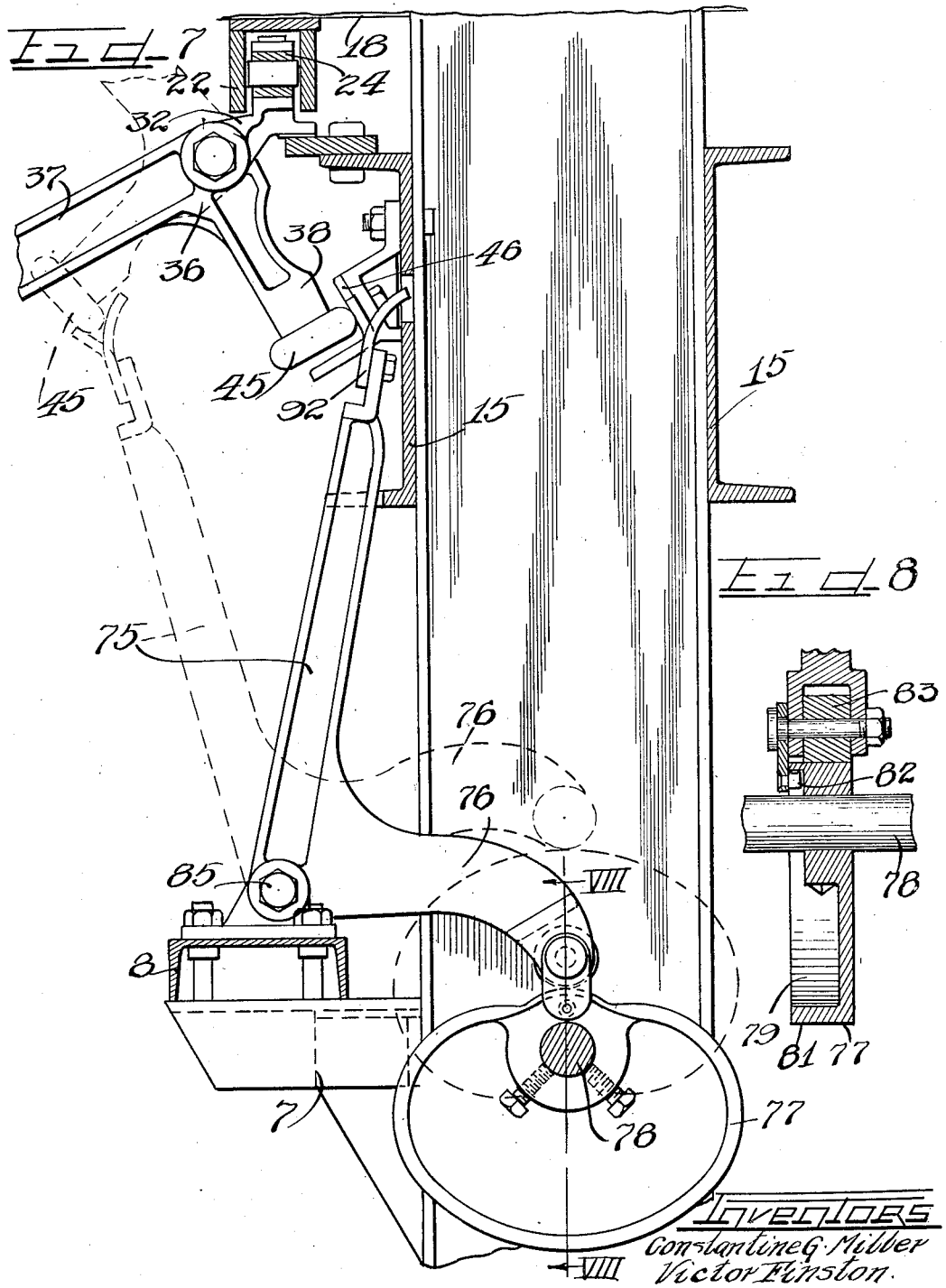

1,965,284

UNITED STATES PATENT OFFICE 1,965,284

ELECTROPLATING MACHINE

Victor Finston and Constantine G. Miller, Cicero, Ill., assignors to The Meaker Company, Cicero, Ill., a corporation of Illinois Application September 29, 1932, Serial No. 635,393

20 Claims. (Cl. 204—5)

This invention relates to electro-plating machines and will be described as embodied in a machine having mechanism for automatically carrying the work through a series of processing tanks and mechanism for automatically transferring the work from one tank to the next in the series.

An object of this invention is the provision of novel mechanism for quickly lifting the work out of one tank and transferring it to the next without undue exposure to the oxidation effect of the air.

Another object is the provision of lifting mechanism so designed and constructed that frictional resistance to the actuation thereof may be minimized, permitting more efficient and economical operation of the machine, resulting in maximum capacity.

A further object is the provision of lifting mechanism arranged and associated with oppositely disposed lifting arms for alternately lifting one and then the other, thereby minimizing the duplication of parts.

In accordance with the general features of this invention, there is provided a processing machine including an endless chain conveyor for carrying the work to be treated along a plurality of horizontally arranged tanks, the chain conveyor having hangers connected to it, each of which has mounted thereon an associated work supporting arm. There is also provided mechanism for at predetermined times raising and lowering such arms whereby the work may be raised out of one tank and then lowered into a succeeding tank and so on down the series of tanks; the lifting mechanism being disposed wholly below the endless conveyor.

Another feature of this processing machine relates to the utilization of the sag and weight of the endless conveyor chain to maintain electrical contact between the bus bar and the hangers for the work supporting arms.

A still further feature of the invention is the provision of a novel lifting mechanism for actuating a work supporting arm.

Other objects and advantages of this invention will become apparent from the following detailed description with reference to the accompanying drawings illustrating the preferred embodiments of this invention.

On the drawings:

Figure 1 is a plan view of an electro-plating machine incorporating my invention.

Figure 2 is a fragmentary side elevation of that shown in Figure 1.

Figure 3 is an enlarged vertical section taken on substantially the line III—III of Figure 1.

Figure 4 is a much enlarged fragmentary section, being a portion of that shown in Figure 3 but on a larger scale.

Figure 5 is a fragmentary elevation of portions of that shown in Figure 1 and taken on substantially the line V—V of Figure 1.

Figure 6 is a fragmentary plan view of that shown in Figure 5.

Figure 7 is a fragmentary view similar to Figure 4, but illustrating a modified form of my invention.

Figure 8 is a vertical section taken on substantially the line VIII—VIII of Figure 7.

As shown on the drawings:

The machine shown in Figures 1 to 6 inclusive comprises a frame 4 including vertical channel supports 5 having a base portion 6 connected thereto and cross members 7 which support downwardly disposed longitudinally extending channels 8 which provide supports for the upwardly extending parallel oscillating arms 9 and 11 pivotally secured at 12 to upwardly extending flanges 13 on supporting plates 14 which are fixed on the channels 8. Longitudinally extending outwardly disposed channels 15 are fixed to the vertical channels 5 for supporting mechanism to be hereinafter described. At the upper end of the vertical members 5 are secured by bolts 17 cross members 18 to which are secured longitudinal plates 19 having fixed thereon depending bars 21 and 22 which serve as guides for the rollers 23 on the chain 24. The chain 24 is mounted on sprockets 25 for movement in a horizontal plane between the guide bars 21 and 22. For the purpose of driving the sprockets 25 there is provided a prime mover 26, preferably an electric motor operably connected through suitable gears 27, 28, 29 and 30 to a longitudinally extending shaft 31. One of the sprockets 25 on the end of the machine adjacent the prime mover 26 is driven directly by the shaft on which the gear 27 is mounted and through the medium of the chain 24 rotates the other sprocket 25 at the opposite end of the machine. Longitudinally spaced along the chain 24 are fixed a plurality of hangers 32 for movement in a horizontal plane by the chain 24. The hangers 32 include a portion 33 normally resting on the bus bar 34 and having continuous sliding contact therewith.

On the hangers 32 are pivotally mounted by bolts 35 bell crank levers 36 including work support arms 37 and force arms 38. The work support arms 37, as shown in Figure 3, include hook portions 39 extending over the processing tanks 41 and 42 for supporting articles to be processed in the tanks, and for lifting the same over the partitions or ends of the tanks and lowering them into the next tank of the series for continuation of the plating process. The arms 37 are lifted by application of outward force on the force arms 38 as illustrated in Figure 3. On the lower ends of the force arms are mounted antifriction devices such as rollers 45 which normally engage the laterally spaced tracks 46 and 47. The tracks 46 are fixed close to the channels 15 and the tracks 47 are spaced laterally from the channels 15 by supporting brackets 48 best shown in Figures 4 and 6. While the rollers 45 are supported on the tracks 47, the arms 37 are held in their uppermost position, whereas when the rollers 45 are riding on the tracks 46, the arms 37 are in their lowered position. In order that the rollers 45 may be transferred from a track 46 to a track 47, there is provided a transfer plate 49 secured on a vertical flange 51 of a connecting member 52 pivotally secured by bolts 53 to the upper ends of the actuating arms 9 and 11 for securing the same together in parallel relation so that the flange 51 remains vertical through its range of movement.

The speed of the chain 24 is coordinated with the movement of the parallel arms 9 and 11 such that when the rollers 45 pass from the tracks 46 to the transfer plates 49 the transfer plates 49 are moved outwardly in timed relation therewith to transfer the rollers 45 to the tracks 47, and similarly for transferring the rollers 45 from the tracks 47 to the tracks 46 after the arms 37 have lifted the work from one tank and transferred it to a position above another tank.

For the purpose of oscillating the parallel arms 9 and 11, there is provided a plurality of longitudinally spaced plungers 61 having mounted therein oppositely disposed rollers 62 and 63 engageable with a cam 64 mounted on the shaft 31 for imparting reciprocatory motion to each plunger 61. The shaft 31 passes through a slotted opening 65 in the plunger 61 thereby providing a guide for the free end of the plunger.

In the form of our invention illustrated in Figures 7 and 8, a single oscillating arm 75 is employed, which arm forms substantially right angles with the actuating portion 76 which is raised and lowered by means of a cam 77 on a line shaft 78 corresponding with the shaft 31 in Figure 4, but being positioned at a lower point longitudinally through the machine. The cam 77 best illustrated in Figure 8 is provided with internal and external working surfaces 79 and 81 engageable by the rollers 82 and 83 respectively. By this arrangement the arm 75 is caused to move outwardly and backwardly on its pivot 85 for moving the roller 45 to the position shown in dotted outline and again returning to the position shown in full lines in Figure 7 for raising and lowering the arm 37. The transfer plate 92 is formed with one portion bent forwardly and one portion bent backwardly for the purpose of making rolling contact with the roller 45 as the roller moves longitudinally of the machine and the transfer plate moves outwardly and backwardly for moving the arm 37.

While we have herein illustrated only the preferred embodiments of this invention, it will be appreciated by those skilled in the art that it is susceptible of various changes and modifications without departing from the principles of the invention and we do not desire that the patent to be granted hereon shall be limited in any manner except as required by the prior art.

We claim as our invention:

1. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising actuating arms pivotally mounted on said frame and operably engageable with a portion of said work support arms and means for oscillating said actuating arms.

2. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising actuating arms pivotally mounted on said frame and operably engageable with a portion of said work support arms, and cam actuated reciprocating plungers connected to said actuating arms for periodically moving the same.

3. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising actuating arms pivotally mounted on said frame, a bearing plate on said arms operably engageable with a portion of said work support arms and means for oscillating said actuating arms.

4. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising actuating arms pivotally mounted on said frame, a bearing plate on said arms operably engageable with a portion of said work support arms, and cam actuated reciprocating plungers connected to said actuating arms for periodically moving the same.

5. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising actuating arms pivotally mounted on said frame, a bearing plate on said arms operably engageable with a portion of said work support arms, and a cam rotatably mounted on said frame, operably engaging said actuating arm for moving the same.

6. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising actuating arms pivotally mounted on said frame operably engageable with a portion of said work support arms, and a cam rotatably mounted on said frame, operably engaging said actuating arm for moving the same.

7. In an electro-plating machine, a frame, a processing tank including an electric conductor, a bus bar on said frame, a plurality of hangers supported along the sides of said frame for movement in a horizontal plane, a work support arm extending over said tank and pivotally mounted on each hanger for oscillation in a vertical plane, means for moving said hangers along the frame, and mechanism for oscillating said arms to raise and lower the same relative to said tank, said mechanism comprising two linked parallel arms pivotally mounted on said frame and operably connected to said work support, and means for swinging said parallel arms to oscillate said work support.

8. In an electro-plating machine, a frame, a processing tank including an electric conductor, a bus bar on said frame, a plurality of hangers supported along the sides of said frame for movement in a horizontal plane and including a contact portion frictionally engaging said bus bar, a work support arm extending over said tank and pivotally mounted on each hanger for oscillation in a vertical plane, means for moving said hangers along the frame, and mechanism for oscillating said arms to raise and lower the same relative to said tank, said mechanism comprising two parallel arms pivotally connected to said frame and extending upwardly, a plate pivotally connected to the upper ends of said parallel arms for securing them together, a contact member on said plate operably engageable with said work support arm for moving the same, and means for oscillating said parallel arms.

9. In an electro-plating machine, a frame, a processing tank including an electric conductor, a bus bar on said frame, a plurality of hangers supported along the sides of said frame for movement in a horizontal plane and including a contact portion frictionally engaging said bus bar, a work support arm extending over said tank and pivotally mounted on each hanger for oscillation in a vertical plane, means for moving said hangers along the frame, and mechanism for oscillating said arms to raise and lower the same relative to said tank, said mechanism comprising two parallel arms pivotally connected to said frame and extending upwardly, a plate pivotally connected to the upper ends of said parallel arms for securing them together, a contact member on said plate operably engageable with said work support arm for moving the same, and a cam actuated reciprocating plunger connected to one of the parallel arms for imparting oscillation thereto.

10. In an electro-plating machine, a frame, a processing tank including an electric conductor, a bus bar on said frame, a plurality of hangers supported along the sides of said frame for movement in a horizontal plane and including a contact portion frictionally engaging said bus bar, a work support arm extending over said tank and pivotally mounted on each hanger for oscillation in a vertical plane, means for moving said hangers along the frame, and mechanism for oscillating said arms to raise and lower the same relative to said tank, said mechanism comprising two parallel arms pivotally connected to said frame and extending upwardly, a plate pivotally connected to the upper ends of said parallel arms for securing them together, a contact member on said plate operably engageable with said work support arm for moving the same, and a cam rotatably mounted on said frame, operably engageable with said parallel arms for imparting oscillation thereto.

11. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bellcrank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame.

12. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising transfer plates for said rollers and means for reciprocating said plates toward and from said tanks when engaged by said rollers.

13. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising transfer plates for said rollers, and reciprocating plungers operated by said power means operably connected to said transfer plates for reciprocating the same when engaged by said rollers.

14. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising transfer plates for said rollers, and cam actuated means operably connected to said transfer plates to actuate the same.

15. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising actuating arms on said frame supporting said transfer plates and means for oscillating said actuating arms.

16. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising actuating arms on said frame supporting said transfer plates and cam actuated reciprocating plungers connected to said actuating arms for periodically moving the same.

17. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising two parallel arms pivotally connected to said frame and extending upwardly, a support pivotally connected to the upper end of said parallel arms for securing them together, a transfer plate for said rollers fixed to said support, and means for oscillating said parallel arms.

18. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising two parallel arms pivotally connected to said frame and extending upwardly, a support pivotally connected to the upper end of said parallel arms for securing them together, a transfer plate for said rollers fixed to said support, and a cam actuated reciprocating plunger connected to one of the parallel arms for imparting oscillation thereto.

19. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said mechanism comprising two parallel arms pivotally connected to said frame and extending upwardly, a support pivotally connected to the upper end of said parallel arms for securing them together, a transfer plate for said rollers fixed to said support, and a cam rotatably mounted on said frame operably engageable with said parallel arms for imparting oscillation thereto.

20. In an electro-plating machine, a frame, processing tanks along the sides of the frame and including an electric conductor of one potential, a bus bar on said frame having a different potential, power means for operating said machine, an endless chain mounted in a horizontal plane for movement along the sides of said frame and driven by said power means, hangers fixed to said chain for movement therewith, a bell crank lever comprising a work support arm and a force arm pivotally mounted on each of said hangers, said work support arm extending over said tank, rollers on said force arms, a plurality of laterally spaced tracks fixed on said frame for engagement by said rollers, and mechanism for oscillating said force arms and transferring said rollers successively from one track to the next as they are moved along the frame, said hangers resting on said bus bar and forming electrical connections between the bus bar and said work support arms, whereby the weight of the work support arms maintains a continuous electrical connection with the bus bar.

VICTOR FINSTON.
CONSTANTINE G. MILLER.